Patented Oct. 26, 1937

2,097,231

UNITED STATES PATENT OFFICE 2,097,231

ICE CREAM MIX AND PROCESS OF MAKING SAME

Howard J. Lucas, Pasadena, Calif., assignor to Kelco Company, Los Angeles, Calif., a corporation of Delaware No Drawing. Original application July 2, 1934, Serial No. 733,530. Divided and this application October 9, 1936, Serial No. 104,901

17 Claims. (Cl. 99—136)

This invention is a novel ice-cream or ice-milk mixture, and process of making same, and the principal object is to produce such product by incorporating therein an alginate compound which is readily soluble in milk. The present application is a division of my copending application Serial No. 733,530, filed July 2, 1934.

All alginates heretofore made, to the best of my knowledge and information, have been insoluble in milk or products containing milk. This is especially true of the high viscosity alginates, even when mixed with a fairly large percentage of sugar and dried. Heretofore such alginates, or mixtures thereof, although finely ground, will not completely dissolve when added to milk, at room temperature, at 180° F., or at intermediate temperature, but the alginates remain suspended in the form of distinctly visible particles even after long and vigorous stirring. Consequently, when such alginates were used in dairy products, it was necessary to first prepare a water solution of the alginate and add this to the milk. Thus when alginates were to be used in ice creams, the alginate had to be first dissolved in water and then added to the ice cream mix. Many manufacturers of ice cream object to any addition of water to their mixture and therefore, cannot use alginate in their ice cream. The necessity for first making water solutions of the alginates not only involved expense and time in preparing the final edible, but in some cases, the water affected the quality; and special equipment was involved, and many dairies lacking such equipment have been unable to use alginates for the above reasons.

In my present invention I employ a relatively dry soluble alginate compound which may be dissolved directly in milk, or products containing milk, without preliminary dissolving in water or special handling such as heretofore required; and without any special equipment; and solutions of my novel product in milk can be made in the usual pasteurizing vats.

One practical method of manufacturing the milk soluble alginate compound I use in my ice cream mix is as follows: A quantity of alginic acid (preferably such as disclosed in Thornley-Walsh Patent No. 1,814,981, dated July 14, 1931; and Clark-Green Patent No. 2,036,922, dated April 7, 1936; and Green Patent No. 2,036,934, dated April 7, 1936, which usually contains about 85% to 90% water and has a fibrous character) is placed in a suitable mixer.

Enough soda ash is then added to the alginic acid to produce, when thoroughly mixed therewith, a sodium alginate paste of about 7 pH. Preferably the soda ash is dusted into the mixer to aid in uniformly distributing its throughout the mass. In place of soda ash, other neutralizing agents such as sodium bicarbonate and sodium hydroxide, may be used. The mixing is continued long enough (usually about 20 minutes) to insure conversion of all the alginic acid into a sodium alginate paste.

To this paste is then added a phosphate (preferably trisodium phosphate) or similar material. The anhydrous weight of such trisodium phosphate is approximately equal to $\frac{1}{8}$ of the anhydrous weight of the alginic acid. This trisodium phosphate is added in dry form ($Na_3PO_4.12H_2O$ or $Na_3PO_4.H_2O$)

and mixed into the paste until it has thoroughly dissolved and reacted; this ordinarily occurs in about ten minutes time. When sugar, or other suitable agent for increasing solubility and for controlling the colloidal efficiency of the product, is used, it is added in a similar manner to the phosphate.

The resultant mixture is then spread onto trays and dried; or it may be dried in the sun, in which case one to three days time may be required, depending on the weather conditions; or it may be dried artificially by means of a drum dryer, spray dryer, mechanical tray belt tunnel dryer, or other suitable means.

The dried material, which may contain about 10-15% water, is then ground and screened to a convenient size for marketing. The product may be of any suitable size. Preferably the dried material is reduced to a size which will pass through a 20 mesh screen and over an 80 mesh screen. The smaller the particle size, the faster the solution rate when the particles are dispersed in milk. As too fine particles may tend to cake prior to use, I usually remove the finest particles (at present those which pass through an 80 mesh screen), and place them in the mixer with the alginic acid and soda ash in the initial step of preparing more of my product. This disposes of such fines, and they aid in thickening the paste so that it will dry faster.

For a thoroughly milk soluble alginate the pH of the finished product in a 1% water solution would preferably be above 7.5; and the more the pH increases, the quicker the product will go into solution in milk.

For practical purposes a useful ratio of trisodium (anhydrous) to the anhydrous alginic acid is about 1:8.

This novel soluble alginate compound may be added directly to an ice cream mix at pasteurizing temperatures of about 140° to 160° F., while stirring it in the pasteurizing vat. After pasteurization is complete, the mix may be cooled and frozen in the usual manner.

A soluble alginate such as ammonium, potassium or magnesium alginate, or any other suitable water soluble alginate, or any combination of these, may be incorporated in a paste form with trisodium phosphate to obtain the milk soluble phospho-alginate compound. When soluble alginates other than sodium alginate are to be incorporated, the corresponding carbonates, bicarbonate or hydroxides may be added for neutralizing the alginic acid.

In place of trisodium phosphate other phosphates may be used, such as disodium phosphate, monosodium phosphate, or combinations of these. Phosphoric acid also may be used, or any combination of it with the above salts. Soluble phosphates other than those of sodium may also be used. Sodium hydroxide, or other strongly basic substance, may also be used in conjunction with these compounds in order to bring the pH to the desired value. In such case, the phosphates may be added to the alginic acid before the carbonates. The sodium hydroxide or other strongly basic substance may be added previous to, during and/or subsequent to the incorporation of the phosphoric compound with the alginic compound.

It must be remembered, however, that the ratio of the amount of substitutes used for trisodium phosphate will necessarily have a different effective ratio to the alginic acid content than the trisodium phosphate. The substitution may be complete or partial, or made with several different substitutes.

The product may be a sodium phospho-alginate, or as hereinafter described, may consist of a compound of sodium alginate and the sodium salt of an acid whose calcium salt is insoluble in water, such as sodium silicate, sodium citrate, sodium tartrate, sodium carbonate, sodium caseinate, according to the specific chemicals employed. In lieu of the sodium compounds mentioned above, the corresponding potassium and ammonium salts and other water soluble salts which do not form a precipitate with sodium alginate, may be used.

My new milk soluble alginate products substantially increase the effectiveness of the contained sodium alginate in its ability to stabilize ice cream and ice milk.

The milk soluble alginate I employ is fully set forth and claimed in the parent application aforesaid, and is especially useful in the manufacture of ice cream mixes.

The said milk soluble alginate compound is also useful in dry ice cream mix powders, as it can be dissolved in the ice cream mix before drying. Any form of drying could be used, spray drying and drum drying are effective. The resulting dry product will be stabilized when reconstituted in water or milk. Due to the small amount of the new product required in commercial use and to the buffer effect of milk, the pH of the milk in the ice cream mix is substantially unchanged.

All grades of reconstituted milk containing such milk soluble alginate can be used like ordinary grades of reconstituted milk, or the corresponding grades of fresh milk, as an ingredient in an ice cream mix, and to such mix it is unnecessary to add separately any stabilizer. In the same way, my dry ice cream mix powder containing such milk soluble alginate can be reconstituted in water, milk or other suitable dairy product to form a complete wet ice cream mix ready for freezing to produce ice cream.

In the claims I have used the term "frozen milk product" as inclusive of either ice cream or ice milk mixture, and have also used the term "milk" as inclusive of cream.

I claim:—

1. A frozen milk product mixture containing an edible milk soluble alginate compound containing a soluble salt of an acid whose calcium salt is insoluble in water.

2. A frozen milk product mixture containing a milk soluble alginate compound comprising an edible water soluble salt of alginic acid and an edible water soluble salt of an acid whose calcium salt is insoluble in water.

3. A frozen milk product mixture containing a milk soluble alginate compound comprising an edible water soluble salt of alginic acid and an edible water soluble citrate.

4. A frozen milk product mixture containing a milk soluble alginate compound comprising an edible water soluble salt of alginic acid and an edible water soluble carbonate.

5. A frozen milk product mixture containing a milk soluble alginate compound comprising sodium alginate and the sodium salt of an edible acid whose calcium salt is insoluble in water.

6. A frozen milk product mixture containing a milk soluble alginate compound comprising sodium alginate and the sodium salt of an edible acid whose calcium salt is insoluble in water, and an edible substance to aid dissolving, such as sugar.

7. A frozen milk product mixture containing a milk soluble alginate compound, comprising an edible water soluble alginate and an edible water soluble phosphate.

8. A frozen milk product mixture containing a milk soluble alginate compound, comprising an edible water soluble salt of alginic acid and sodium phosphate, and having a pH of over 7.5.

9. A milk product powder for use in making frozen milk products, containing an edible milk soluble alginate compound containing a soluble salt of an acid whose calcium salt is insoluble in water.

10. A frozen milk product powder containing a milk soluble alginate compound, comprising an edible water soluble salt of alginic acid and a soluble edible salt of an acid whose calcium salt is insoluble in water.

11. A frozen milk product powder containing an edible milk soluble phospho-alginate.

12. A frozen milk product powder containing a milk soluble alginate compound, comprising an edible water soluble salt of alginic acid and sodium phosphate, and having a pH of over 7.5.

13. A frozen milk product powder containing a milk soluble alginate compound comprising an edible water soluble alginate and an edible water soluble phosphate.

14. In the process of manufacturing a frozen milk product, the step of adding an edible milk soluble alginate compound containing a soluble salt of an acid whose calcium salt is insoluble in water to the milk mix at pasteurizing temperatures.

15. In the process of manufacturing a frozen milk product, the step of adding to the milk mix at pasteurizing temperatures a milk soluble alginate compound comprising an edible water soluble salt of alginic acid and an edible, water soluble salt of an acid whose calcium salt is insoluble in water.

16. In the process of manufacturing a frozen milk product, the step of adding to the milk mix at pasteurizing temperatures a milk soluble alginate compound comprising sodium alginate and sodium phosphate.

17. The process of producing a frozen milk product mixture consisting in mixing an edible milk soluble alginate compound containing a soluble salt of an acid whose calcium salt is insoluble in water with an ice milk mix, and drying the mixture.

HOWARD J. LUCAS.